United States Patent
Heo

(10) Patent No.: US 9,645,687 B2
(45) Date of Patent: May 9, 2017

(54) TOUCH PANEL

(71) Applicant: LG INNOTEK CO., LTD., Seoul (KR)

(72) Inventor: Seong Ho Heo, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/613,433

(22) Filed: Feb. 4, 2015

(65) Prior Publication Data

US 2015/0220180 A1    Aug. 6, 2015

(30) Foreign Application Priority Data

Feb. 5, 2014   (KR) .................. 10-2014-0012998

(51) Int. Cl.
*G06F 3/045*   (2006.01)
*G06F 3/044*   (2006.01)

(52) U.S. Cl.
CPC .... *G06F 3/044* (2013.01); *G06F 2203/04103* (2013.01); *G06F 2203/04111* (2013.01)

(58) Field of Classification Search
CPC .............. G06F 3/044; G06F 43/0412; G06F 2203/04111; G06F 2203/04103
See application file for complete search history.

(56) References Cited

U.S. PATENT DOCUMENTS

| | | | | |
|---|---|---|---|---|
| 2011/0221699 A1* | 9/2011 | Kim | ................ | G06F 3/041 |
| | | | | 345/174 |
| 2011/0279398 A1* | 11/2011 | Philipp | ............ | G06F 3/044 |
| | | | | 345/174 |
| 2012/0113032 A1* | 5/2012 | Itakura | ............ | G06F 3/044 |
| | | | | 345/173 |
| 2013/0082961 A1* | 4/2013 | Wang | .............. | G06F 3/044 |
| | | | | 345/173 |
| 2013/0258570 A1 | 10/2013 | Nashiki et al. | ......... | 361/679.01 |
| 2013/0277197 A1* | 10/2013 | Mi | ............... | H03K 17/962 |
| | | | | 200/600 |

FOREIGN PATENT DOCUMENTS

| | | | | |
|---|---|---|---|---|
| KR | 10-2010-0086533 A | 8/2010 | | |
| KR | 20120067031 A | * 6/2012 | ......... | G02F 1/13338 |
| KR | 10-2010-0100355 A | 9/2013 | | |

* cited by examiner

*Primary Examiner* — Kent Chang
*Assistant Examiner* — Mark Edwards
(74) *Attorney, Agent, or Firm* — KED & Associates LLP

(57) ABSTRACT

A touch panel includes a cover substrate on which an active area and an unactive area are defined, and a printing layer on the unactive area. The printing layer includes a first printing layer, and a second printing layer on the first printing layer. The second printing layer is spaced apart from the first printing layer.

15 Claims, 12 Drawing Sheets

TOUCH PANEL

CROSS-REFERENCE TO RELATED APPLICATION

This application claims priority under 35 U.S.C. §119 to Korean Application No. 10-2014-0012998 filed on Feb. 5, 2014, whose entire disclosure is incorporated herein by reference.

BACKGROUND

1. Field

The embodiment relates to a touch panel.

2. Background

Recently, a touch panel, which performs an input function through the touch of an image displayed on a display device by an input device, such as a stylus pen or a finger, has been applied to various electronic appliances. Such a touch panel may be typically classified into a resistive touch panel and a capacitive touch panel.

In the resistive touch panel, glass is shorted with an electrode due to the pressure of the input device so that a touch point is detected. In the capacitive touch panel, the position of the touch point is detected by detecting the variation in capacitance between electrodes when a finger of the user is touched on the capacitive touch panel.

In the resistive type touch panel, the repeated use thereof may degrade the performance thereof, and cause scratches. The interest on the capacitive type touch panel representing superior endurance and having a long lifespan is increased.

The touch panel includes a cover substrate and/or substrate in which an active area to sense a touch point and an unactive area disposed at a peripheral portion of the active area are defined. The unactive area may be printed with a material having a predetermined color to prevent a printed circuit board, through which a wire is connected to an external circuit, from being viewed from an outside.

In this case, the printing layer may be formed by using color ink and may be formed by using two colors or more according to a color. However, bubbles may be generated due to the step difference between the printing layers when a cover substrate and a substrate are laminated. For this reason, an error generation rate may be increased and the reliability may be deteriorated.

BRIEF DESCRIPTION OF THE DRAWINGS

The embodiments will be described in detail with reference to the following drawings in which like reference numerals refer to like elements wherein:

FIGS. 12 to 19 are sectional views showing a touch panel according to another embodiment.

DETAILED DESCRIPTION

Figure 1:
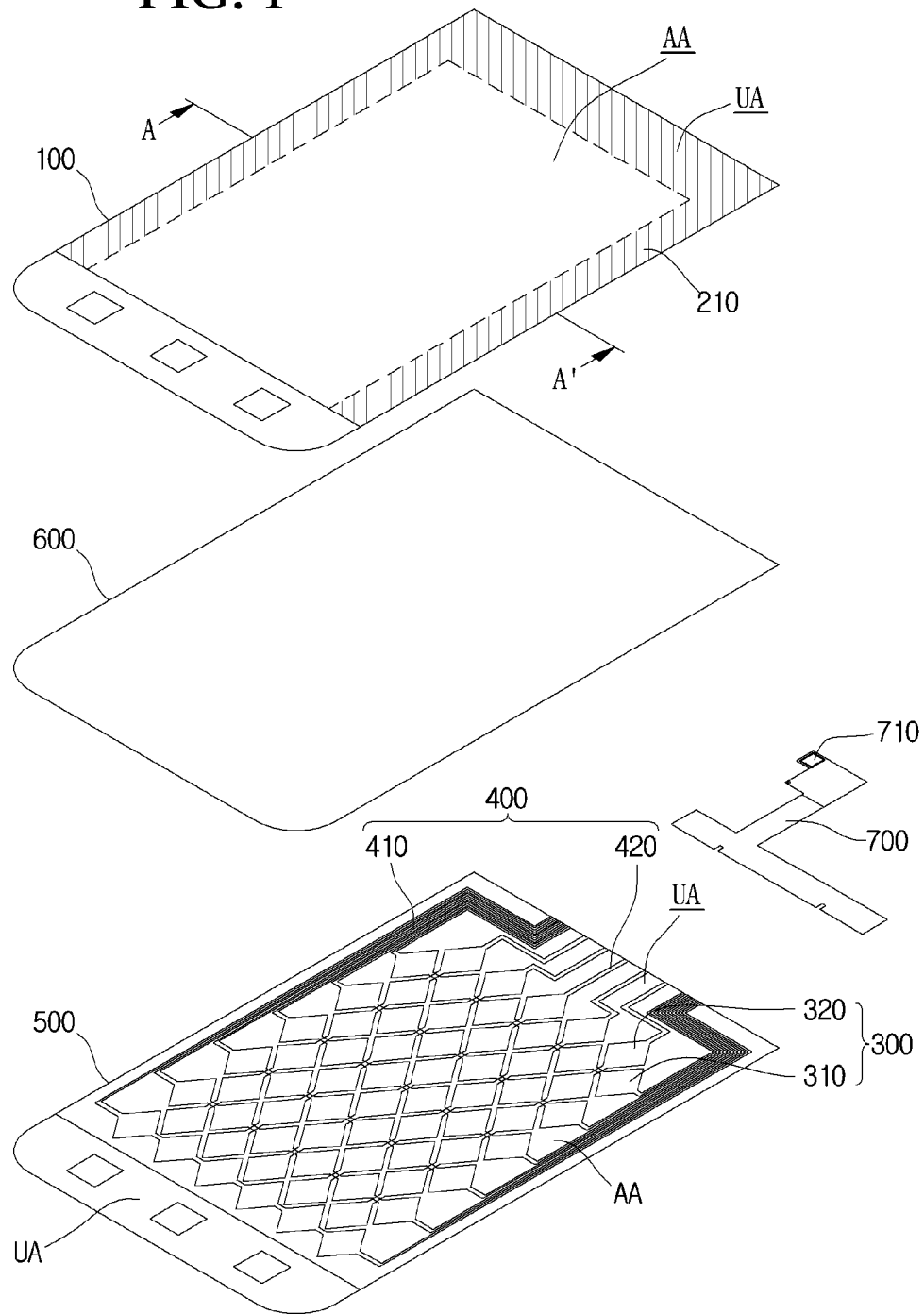
FIG. 1 is an exploded perspective view showing a touch panel according to one embodiment.
Figure 2:
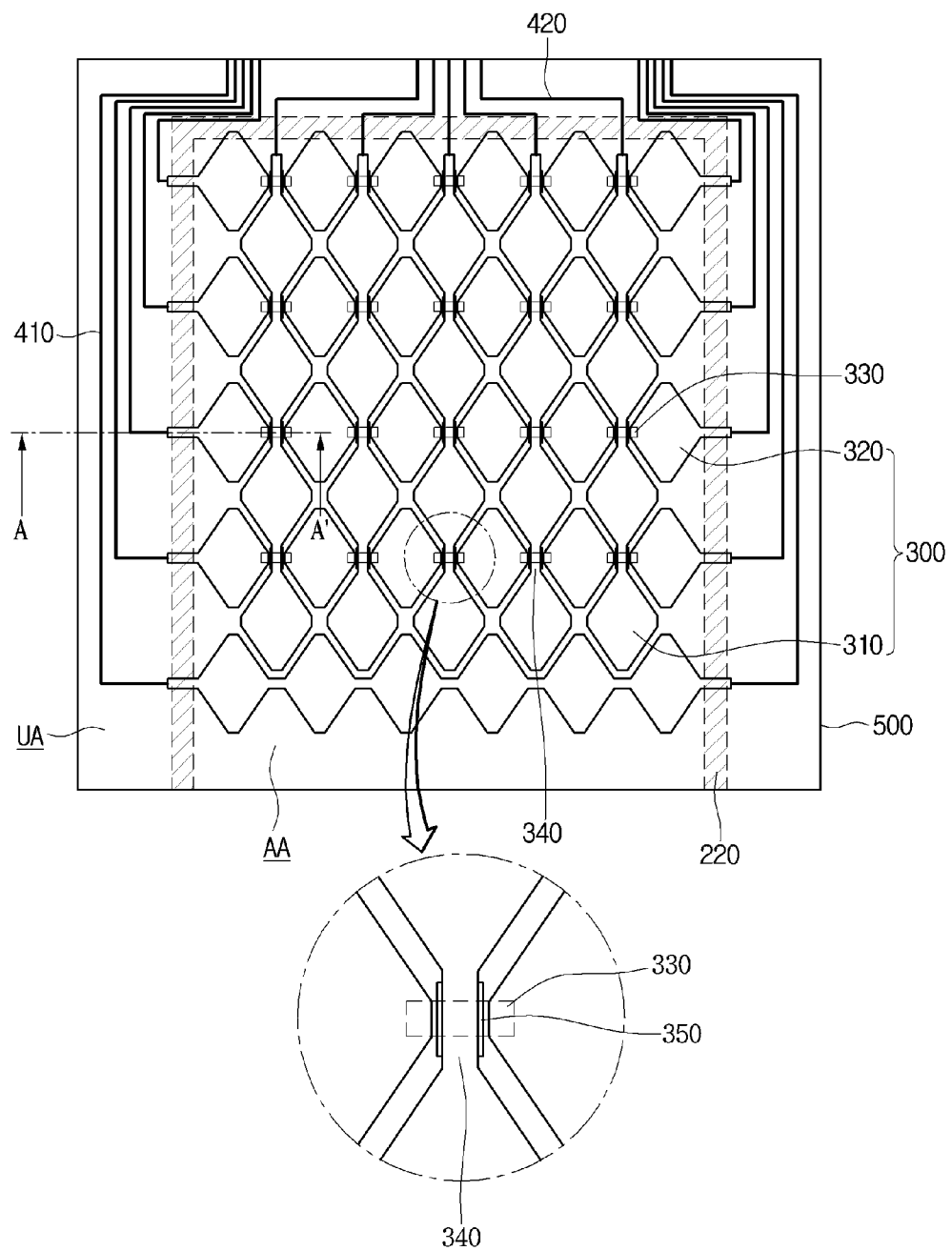
FIG. 2 is a plane view showing a touch panel according to one embodiment.
Figure 3:
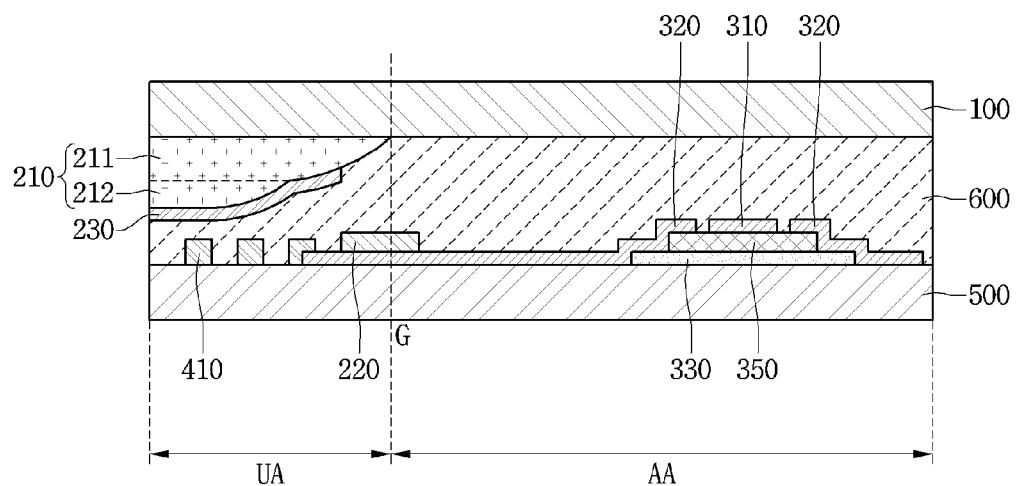
FIG. 3 is a sectional view taken along line A-A' of FIG. 2.

Referring to FIGS. 1 to 3, a touch panel according to an embodiment may include a cover substrate 100 and a substrate 500. The cover substrate 100 may include an active area AA and an unactive area UA. The active area AA refers to an area through which a touch instruction may be input by a user. Unlike the active area AA, the unactive area UA refers to an area to which the touch instruction is not input because the unactive area UA is not activated even if the touch of the user is input thereto.

The cover substrate 100 may include glass or plastic. For example, the cover substrate 100 may include tempered glass, half-tempered glass, sodalime glass, reinforced plastic, or flexible plastic. The substrate 500 is disposed on the cover substrate 100. The substrate 500 may include plastic. For example, the substrate 500 may include polyethylene terephthalate (PET).

The cover substrate 100 and the substrate 500 may adhere to each other by using transparent adhesive 600 such as optical transparent adhesive (OCA). The substrate 500 may include an active area AA and an unactive area UA. The active area AA and the unactive area UA may be the same as those described above.

Sensing and wire electrodes 300 and 400 may be disposed on the substrate 500. The sensing electrode 300 may be disposed in the active area AA and the wire electrode 400 may be disposed in the unactive area UA. The sensing electrode 300 may include a conductive material. In detail, the sensing electrode 300 may include a transparent conductive material. For example, the sensing electrode 300 may include a transparent conductive material such as indium tin oxide (ITO).

The sensing electrode 300 may include first and second sensing electrodes 310 and 320 and a bridge electrode 330. The first and second sensing electrodes 310 and 320 and the bridge electrode 330 may include the same material or different materials. In addition, the first and second sensing electrodes 310 and 320 and the bridge electrode 330 may be disposed on the same one surface of the substrate 500.

The bridge electrode 330 may be provided, for example, in a bar shape. In detail, the bridge electrodes 330 may be spaced apart from each other by a predetermined interval while being provided in the bar shape. The bridge electrode 330 may perform a function of connecting first or second sensing electrodes 310 or 320, which will be described below, to each other.

An insulating layer 350 may be disposed on the bridge electrode 330. In detail, the insulating layer 350 may be partially disposed on the bridge electrode 330. For example, when the bridge electrode 330 is formed in a bar shape, the insulating layer 350 may be disposed in an area except for one end and the opposite end of the bridge electrode 330, that is, both end portions.

The first and second sensing electrodes 310 and 320 disposed on the active area AA may perform a sensor function of sensing a touch. The first sensing electrode 310 extending in one direction and the second sensing electrode 320 extending in another direction different from the one direction may be disposed on the active area AA. One of the first and second sensing electrodes 310 and 320 may transmit a signal and the other may receive a touch signal. One of the first and second sensing electrodes 310 and 320 may be disposed on the insulating layer 350 and the other may be connected to both ends of the bridge electrode 330.

For example, as shown in FIG. 2, the first sensing electrodes 310 may be disposed on the insulating layer 350 and may be electrically connected to each other through connection parts 340. The sensing electrodes 320 may be connected to both ends of the bridge electrode 330 so that the first sensing electrodes 310 may be electrically connected to each other. The first and second sensing electrodes 310 and 320 may be electrically connected to each other without being short-circuited with each other due to the bridge electrode and the insulating material.

Although it is described in the above description that the bridge electrode, the insulating material and the sensing electrode are stacked in the sequence of the bridge electrode, the insulating material and the sensing electrode, the embodiment is not limited thereto and they may be stacked in the sequence of the sensing electrode, the insulating material and the bridge electrode.

The first wire electrode 410 connecting with the first sensing electrode 310 may be disposed in the unactive area UA of the substrate 500. The second wire electrode 420 connecting with the second sensing electrode 320 may be disposed in the unactive area UA of the substrate 500.

The first and second wire electrodes 410 and 420 may be electrically connected to a printed circuit board 700, respectively. The first and second wire electrodes 410 and 420 may transmit the touch signal sensed by the first and second electrodes 310 and 320 to the printed circuit board 700 on which the driving chip 710 is mounted, so that a touch operation is performed. For example, the printed circuit board 700 may include a flexible printed circuit board (FPCB).

The first and second wire electrodes 410 and 420 may include a conductive material. The first and second wire electrodes 410 and 420 may include a metallic material such as Ag or Cu.

Referring to FIG. 3, printing layers 210, 220 and 230 may be disposed on the unactive area UA. The printing layers 210, 220 and 230 may be disposed on the unactive area UA of the cover substrate 100 and the unactive area UA of the substrate 500, respectively.

First and third printing layers 210 and 230 may be disposed in the unactive area UA of the cover substrate 100. A second printing layer 220 may be disposed in the unactive area UA of the substrate 500. The second printing layer 220 may be spaced apart from the first printing layer 210. The second printing layer 220 may be spaced apart from the third printing layer 230.

The first printing layer 210 may make contact with the cover substrate 100. The first printing layer 210 may extend from one end of the unactive area UA toward a boundary line G between the unactive area UA and the active area AA.

The first printing layer 210 may be formed with 2 colors or more. That is, as shown in the drawings, the first printing layer 210 may include a first color printing layer 211 and a second color printing layer 212. The third printing layer 230 is disposed on the unactive area UA such that electrodes may not be seen from an outside. Thus, the third printing layer 230 may formed by coating black or white ink on the first printing layer 210 in the unactive area UA of the cover substrate 100 and hardening the ink.

The third printing layer 230 may be formed in a color different from that of the first printing layer 210. For example, the first printing layer 210 may include a white printing layer formed by using white ink and the third printing layer 230 may include a black printing layer formed by using black ink.

The second printing layer 220 may make contact with the substrate 500. The second printing layer 220 may make contact with the sensing electrode 300 disposed on the substrate 500. The second printing layer 220 may be disposed in a band shape while surrounding an edge region of the substrate 500, that is, the boundary line G between the active area AA and the unactive area UA.

Although it is described in the embodiment as an example that the second printing layer 220 and the sensing electrode 300 all are provided on one surface of the substrate 500 facing the cover substrate 100, the embodiment is not limited thereto and the second printing layer 220 and the sensing electrode 300 may be formed on mutually opposite surfaces of the substrate 500. For example, the second printing layer 220 may be formed on one surface of the surface 500 facing the cover substrate 100 and the sensing electrode 300 may be formed on another surface of the substrate 500, which is opposite to the one surface.

Light may be prevented from being leaked at the boundary line G between the active area AA and the unactive area UA from an LCD due to the second printing layer 220. The second printing layer 220 may be formed in a color different from that of the first printing layer 210. The second printing layer 220 may be formed in the same color as that of the third printing layer 230.

The second printing layer 220 may be disposed on the substrate 500 and may be formed in the same color as that of a case for receiving an LED. When the color of the case is black, the color of the second printing layer 220 may be black. When the case has another color, the second printing layer 220 may also have a color equal or similar to that of the case.

The first to third printing layers 210 to 230 may be formed at constant thicknesses. The third printing layer 230 may be formed at a thickness less than that of the first printing layer 210. For example, the third printing layer 230 may be formed at a thickness in the range of 3 µm to 5 µm. The first printing layer 210 may be formed at a thickness in the range of about 5 µm to about 8 µm.

When the thickness of the first printing layer 210 is less than about 5 µm, the wire electrode may be seen from an outside so that the visibility may be deteriorated. If the thickness of the first printing layer 210 exceeds about 8 µm, the printing layer is thickened so that the thickness of the touch panel may be increased.

When the thickness of the second printing layer 220 is less than about 3 µm, a light leakage phenomenon may occur in the active area AA by the LCD. If the thickness of the second printing layer 220 exceeds about 5 µm, the thickness may be increased.

According to the embodiment, the second printing layer 220 is spaced apart from the first printing layer 210, so that the thickness of the printing layer formed on the cover substrate 100 may be reduced. When the cover substrate 100 and the substrate 500 are laminated, a foam rate may be reduced due to the thickness of the printing layer so that the reliability may be improved.

According to the related art, since the number of printing colors of the printing layer 210 is greater than that of the second printing layer 220, when the substrate is laminated on the cover substrate, the foam rate is increased so that an error rate is increased. However, according to the embodiment, since the second printing layer 220 is disposed on the substrate 500, a lamination error due to a step difference between the printing layers may be reduced.

Since the second printing layer 220 is spaced apart from the cover substrate 100, the visibility may be improved. According to the related art, the second printing layer 220 having a dark color is formed on the cover substrate 100, so that the outer appearance is deteriorated when viewed from the top. However, according to the embodiment, the printing layer 220 is disposed on the substrate 500 so that a black band is prevented from being revealed.

As described above, although the first to third printing layers have been just described, the embodiment is not limited to the above and in addition, the touch panel according to the embodiment may further include additional printing layers on the third printing layer, which has a width less than that of the third printing layer, according to the color and thickness of the printing layer.

Figure 4:
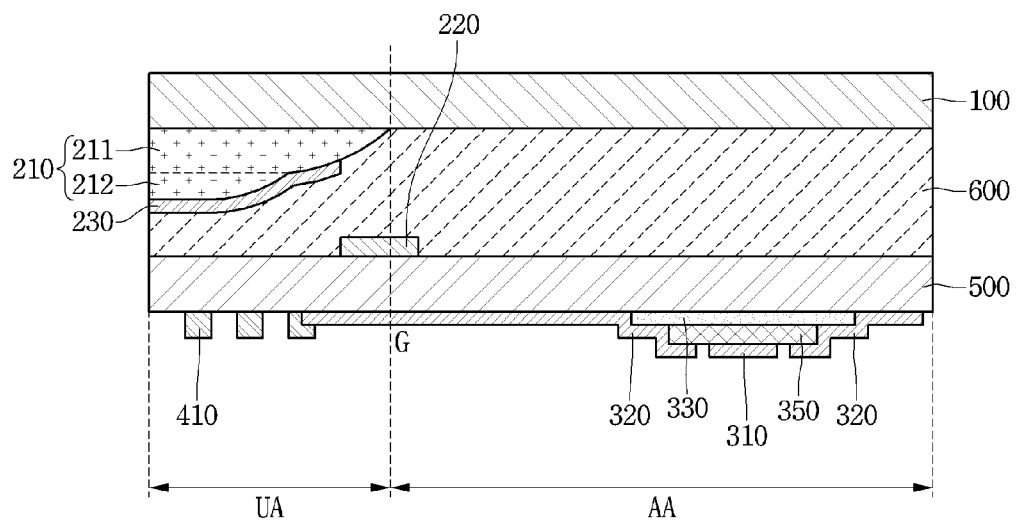
FIGS. 4 to 10 are sectional views showing a touch panel according to another embodiment.

Referring to FIG. 4, according to the touch panel of another embodiment, the second printing layer 220 may be formed on one surface of the substrate 500 facing the cover substrate 100, and the sensing electrode 300 may be formed on an opposite surface to the one surface of the substrate 500.

Figure 5:
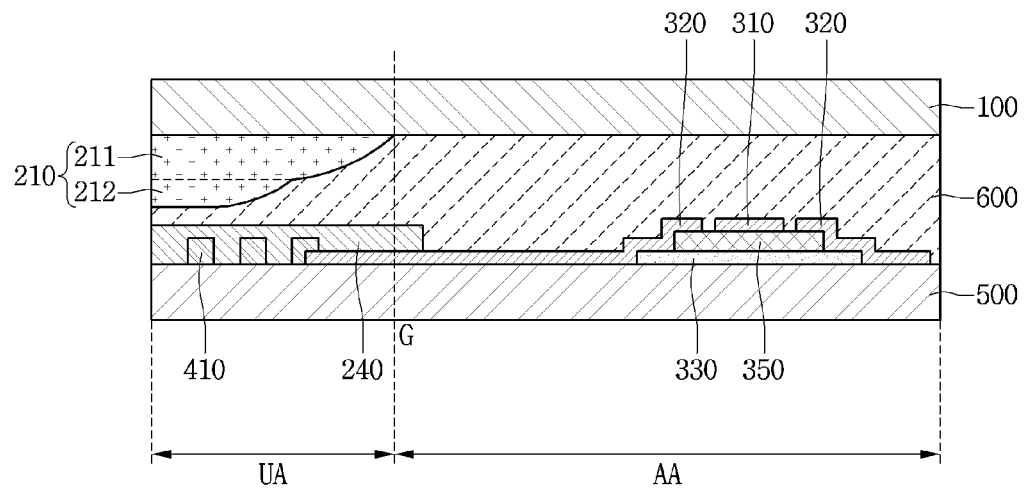

Referring to FIG. 5, according to the touch panel of another embodiment, the first printing layer 210 is disposed on the cover substrate 100 and the second printing layer 240 is disposed on the substrate 500. The second printing layer 240 may extend from one end of the unactive area UA toward the boundary line G between the unactive area UA and the active area AA.

The third printing layer (see reference numeral 230 of FIG. 3) of FIG. 3 described in the above embodiment may be omitted through the second printing layer 240. The thicknesses of the printing layers disposed on the cover substrate 100 may be reduced. When the cover substrate 100 is combined with the substrate 500, the foam rate and the error rate may be reduced. The wire 400 disposed in the unactive area UA may be also prevented from being revealed and the light leakage by an LCD may be prevented due to the second printing layer 240. The above two functions may be achieved through only one printing layer.

Figure 6:
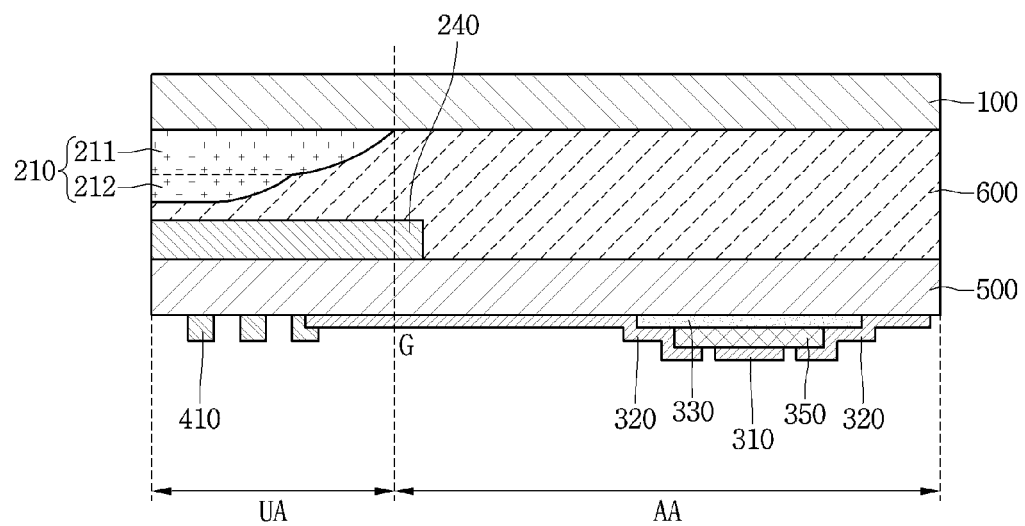

Referring to FIG. 6, according to the touch panel of another embodiment, the second printing layer 240 may be formed on one surface of the substrate 500 facing the cover substrate 100, and the sensing electrode 300 may be formed on an opposite surface to the one surface of the substrate 500.

Figure 7:
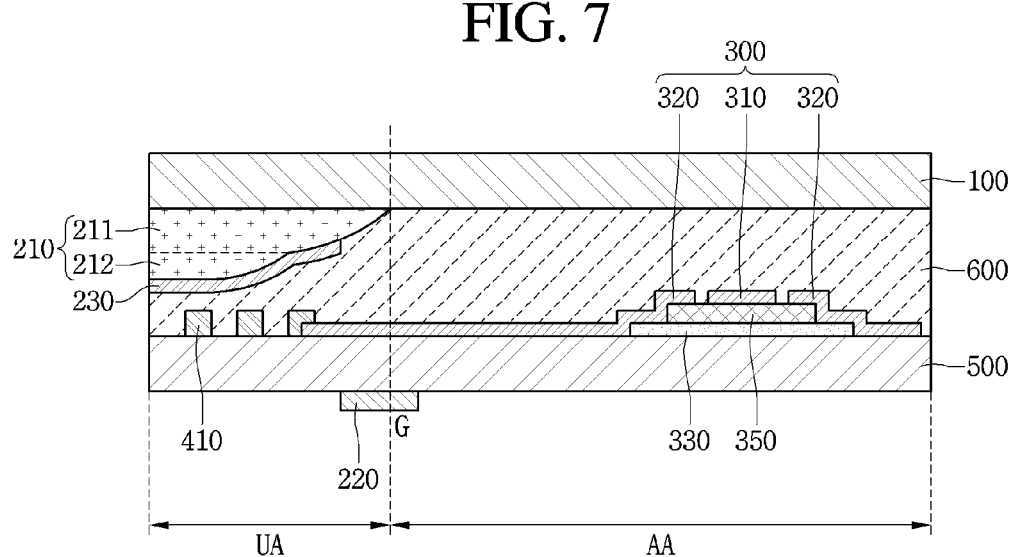

Referring to FIG. 7, the second printing layer 220 may be formed on a surface of the substrate 500 in opposition to the surface of the substrate 500 where the sensing electrode 300 is disposed. The sensing electrode 300 is formed on one surface of the substrate 500 facing the cover substrate 100 and the second printing layer 220 may be formed on an opposite surface to the one surface of the substrate 500. The second printing layer 220 may be directly formed on the substrate 500 and the printability may be improved.

Figure 8:
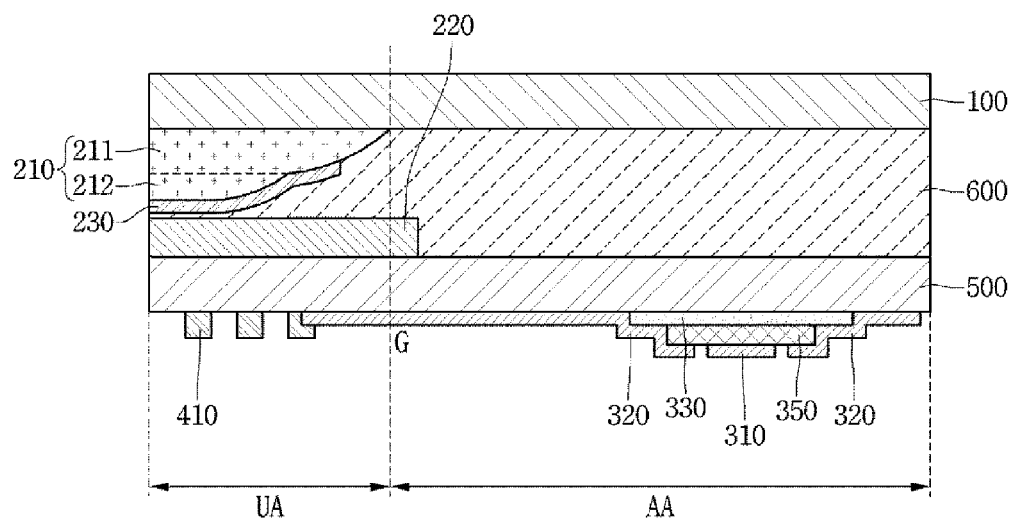

Referring to FIG. 8, the second printing layer 240 may extend from one end of the unactive area UA toward the boundary line G between the unactive area UA and the active area AA. Thus, the wire 400 may be effectively prevented from being revealed.

Figure 9:
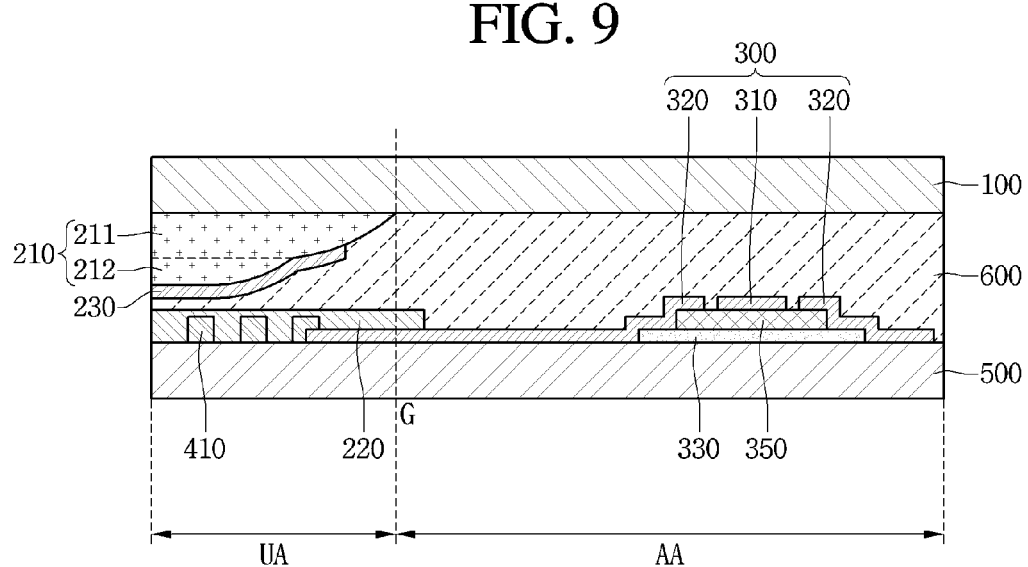

Referring to FIG. 9, according to a touch panel of another embodiment, the second printing layer 220 may be formed on one surface of the surface 500 facing the cover substrate 100 and the sensing electrode 300 may be formed on another surface of the substrate 500, which is opposite to the one surface.

Figure 10:
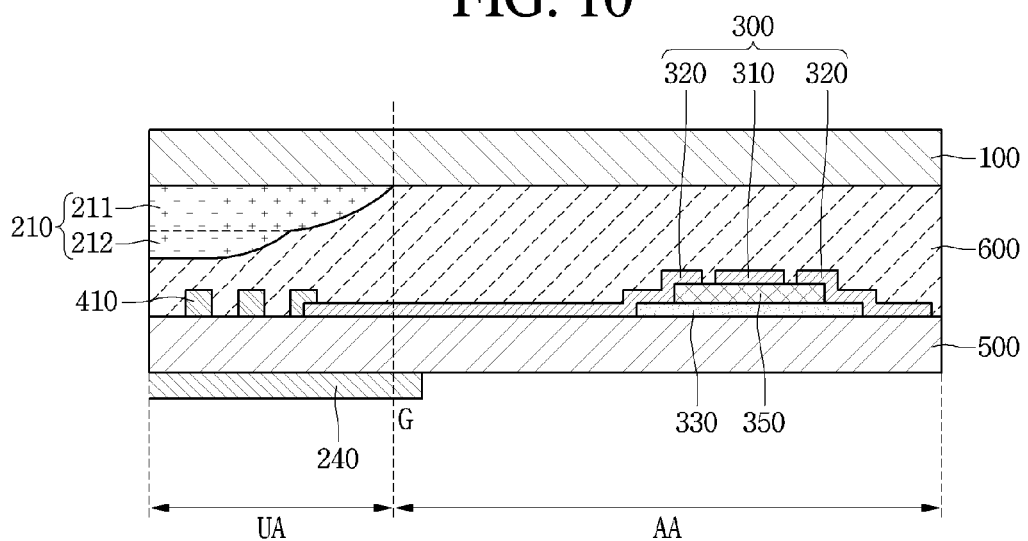

Referring to FIG. 10, the second printing layer 240, which extends from one end of the unactive area UA toward the boundary line G between the unactive area UA and the active area AA, may be formed on a surface of the substrate 500 in opposition to the surface of the substrate 500 where the sensing electrode 300 is disposed. In detail, the sensing electrode 300 may be formed on one surface of the substrate 500 facing the cover substrate 100, and the second printing layer 220 may be formed on an opposite surface to the one surface of the substrate 500. The embodiment is not limited to the above, but the second printing layer 220 and the sensing electrode 300 may be placed on one surface of the substrate 500 and an opposite surface to the one surface, respectively. The second printing layer 240 may be directly formed on the substrate 500, so that the printability is improved.

Figure 11:
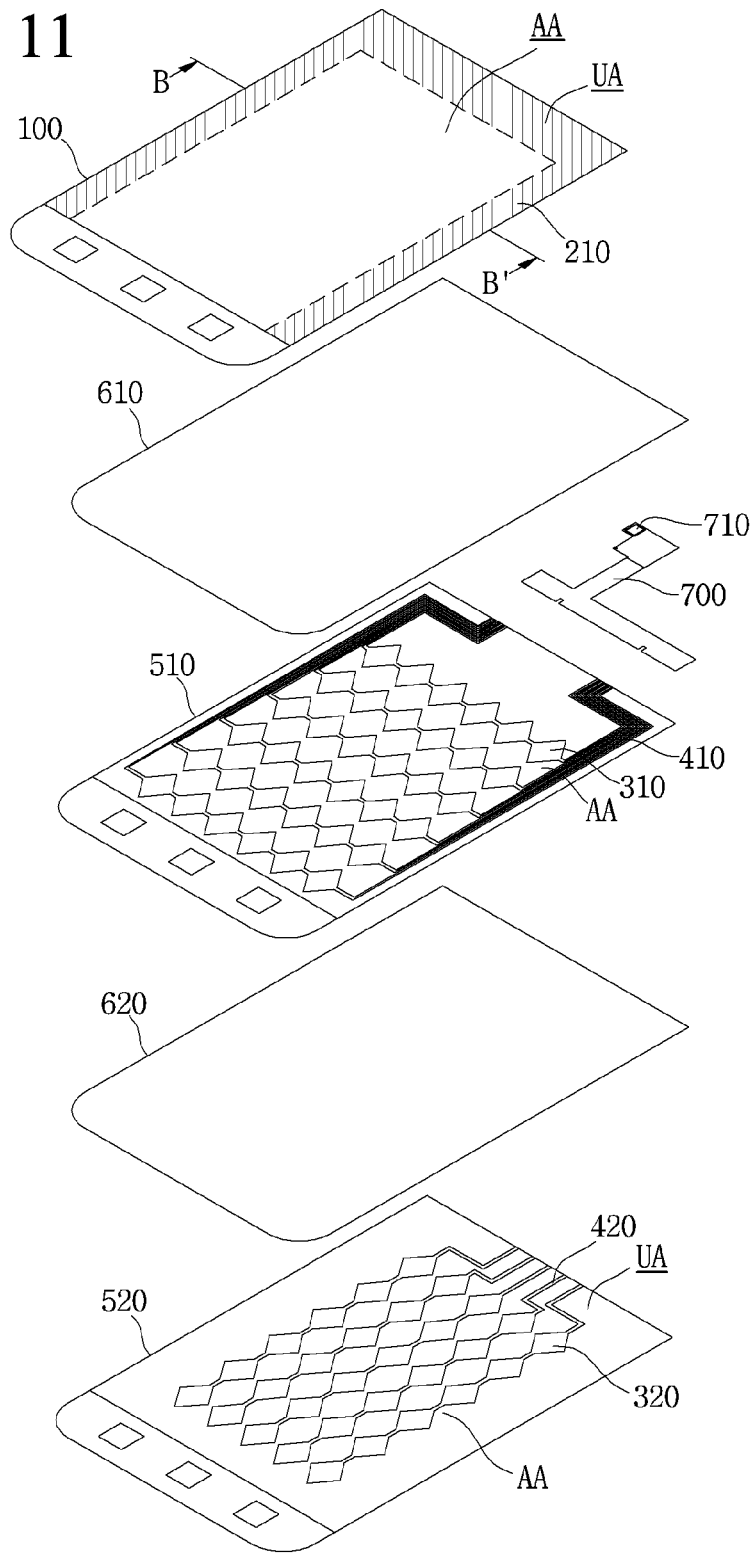
FIG. 11 is an exploded perspective view showing a touch panel according to another embodiment.
Figure 12:
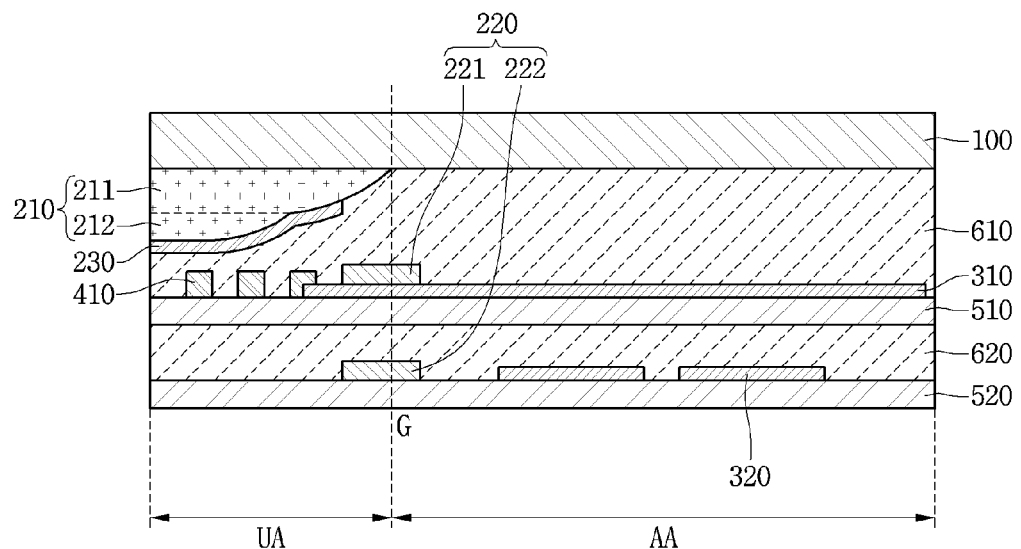
FIG. 12 is a sectional view taken along line B-B' of FIG. 11.

Referring to FIGS. 11 and 12, the first and second substrates 510 and 520 may be further provided on the cover substrate 100. The first and second substrates 510 and 520 include plastic. For example, the first and second substrates 510 and 520 may include polyethylene terephthalate (PET).

The cover substrate 100, the first substrate 510 and the second substrate 520 may adhere to each other by using transparent adhesive 610 and 620 such as optical transparent adhesive (OCA). The cover substrate 100 and the first and second substrates 510 and 520 may include an active area AA and an unactive area UA. The active area AA and the unactive area UA may be the same as those described above.

The first sensing electrode may be disposed in the active area AA of the first substrate 510. The first wire electrode 410 connected to the first sensing electrode 310 may be disposed in the unactive area UA of the first substrate 510. The second sensing electrode 320 may be disposed in the active area AA of the second substrate 520. The second wire electrode 420 connected to the second sensing electrode 320 may be disposed in the unactive area UA of the second substrate 520. The first and second wire electrodes 410 and 420 may be electrically connected to a printed circuit board 700, respectively.

Referring to FIG. 12, the second printing layer 220 may include the fourth printing layer 221 disposed on the first substrate 510 and the fifth printing layer 222 disposed on the second substrate. The printing layers are disposed on each substrate, so that LCD light shielding effect may be increased.

Although it is described in the embodiment as one example that the fourth printing layer 221 and the sensing electrode 300 all are disposed on one surface of the first substrate 510 facing the cover substrate 100, the embodiment is not limited thereto and the fourth printing layer 221 and the sensing electrode 300 may be formed on mutually opposite surfaces of the first substrate 510, respectively. For example, the fourth printing layer 221 may be formed on one surface of the first surface 510 facing the cover substrate 100 and the sensing electrode 300 may be formed on another surface of the substrate 500, which is opposite to the one surface. Although it is described in the embodiment as one example that the fifth printing layer 222 is disposed on one surface of the second substrate 520 facing the first substrate 510, the embodiment is not limited thereto and the fifth printing layer 222 may be also formed on the opposite surface of the second substrate 520.

Figure 13:
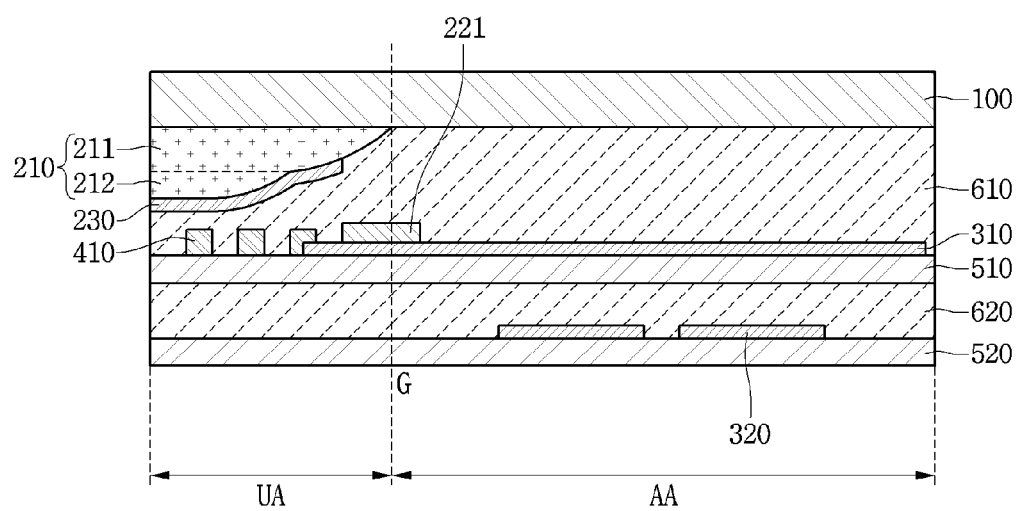
Figure 14:
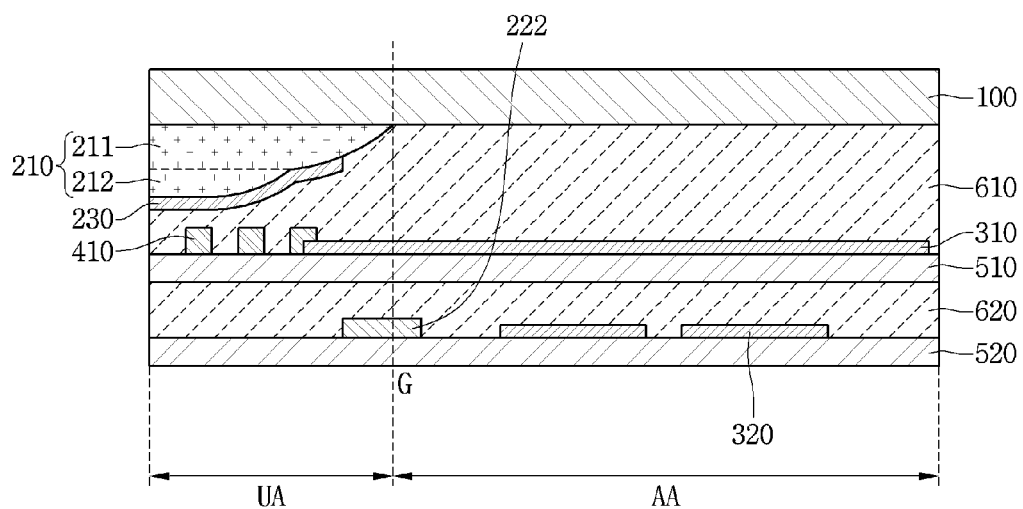
Figure 15:
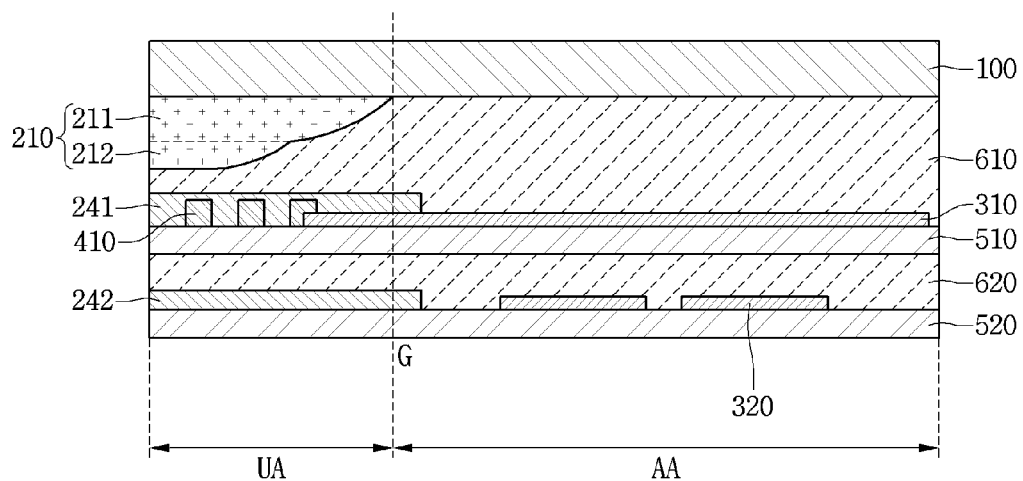

Referring to FIG. 13, the fourth printing layer 221 may be disposed only on the first substrate 510. Referring to FIG. 14, the fifth printing layer 222 may be disposed only on the second substrate 520. Referring to FIG. 15, the fourth and fifth printing layers 241 and 242 may extend from one end of the unactive area UA toward the boundary line G between the unactive area UA and the active area AA.

The third printing layer (see reference numeral 230 of FIG. 5) of FIG. 6 described in the above embodiment may be omitted through the fourth and fifth printing layers 241 and 242. The thicknesses of the printing layers disposed on the cover substrate 100 may be reduced. When the cover substrate 100 is combined with the substrate 510 and 520, the foam rate and the error generation rate may be reduced. The wire electrode 400 disposed in the unactive area UA may be prevented from being revealed and the light leakage by an LCD may be prevented due to the fourth and fifth printing layers 241 and 242. The above two functions may be achieved through only one printing layer. The fourth and fifth printing layers 241 and 242 may be formed on the other surfaces of the first and second substrates 510 and 520, respectively, in opposition to the surfaces where the first and second sensing electrodes 310 and 320 are formed.

Figure 16:
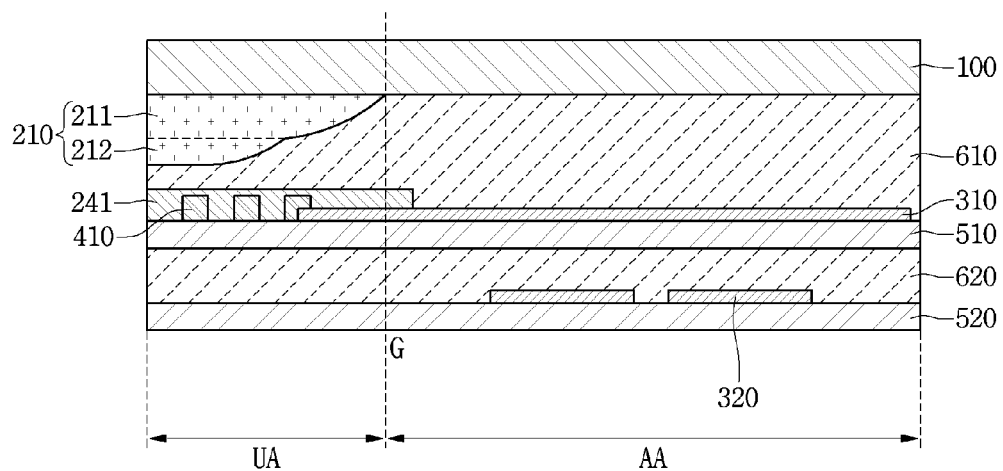
Figure 17:
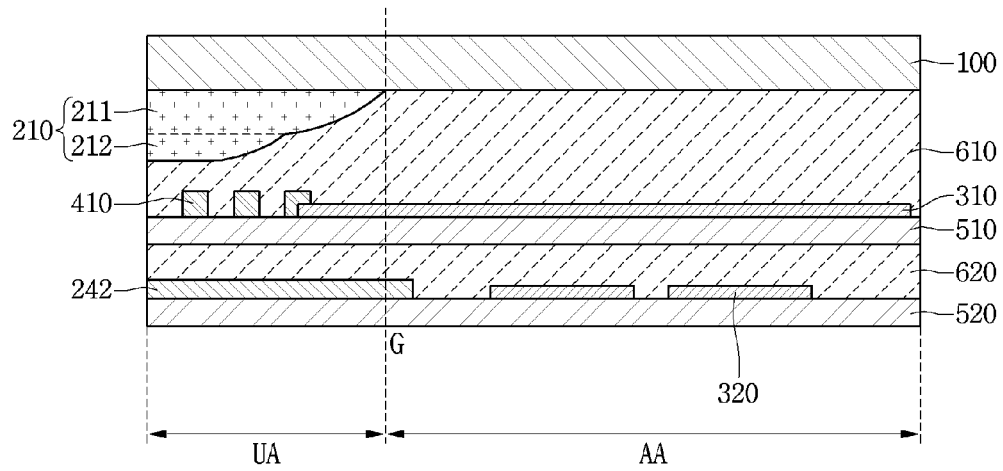

Referring to FIG. 16, the fourth printing layer 241 may be disposed only on the first substrate 510. Referring to FIG. 17, the fifth printing layer 242 may be disposed only on the second substrate 520.

Figure 18:
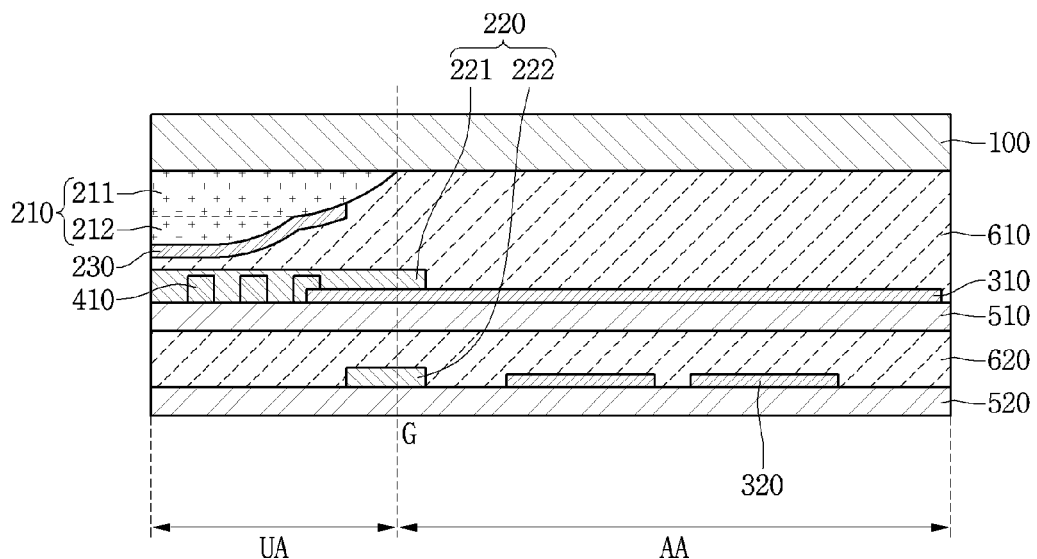

Referring to FIG. 18, the fourth printing layer 221 disposed on the first substrate 510, may extend from one end of the unactive area UA toward the boundary line G between the unactive area UA and the active area AA. The wire electrode 400 may be effectively prevented from being revealed.

Figure 19:
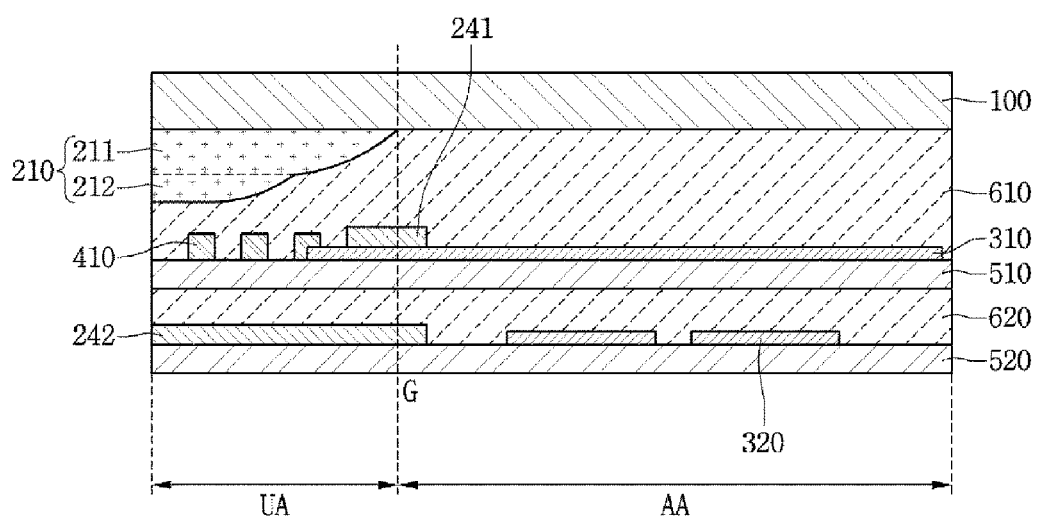

Referring to FIG. 19, the fifth printing layer 242 disposed on the second substrate 520, may extend from one end of the unactive area UA toward the boundary line G between the unactive area UA and the active area AA. The fifth printing layer 242 may be directly formed on the second substrate 520 so that the printability may be improved.

Figure 20:
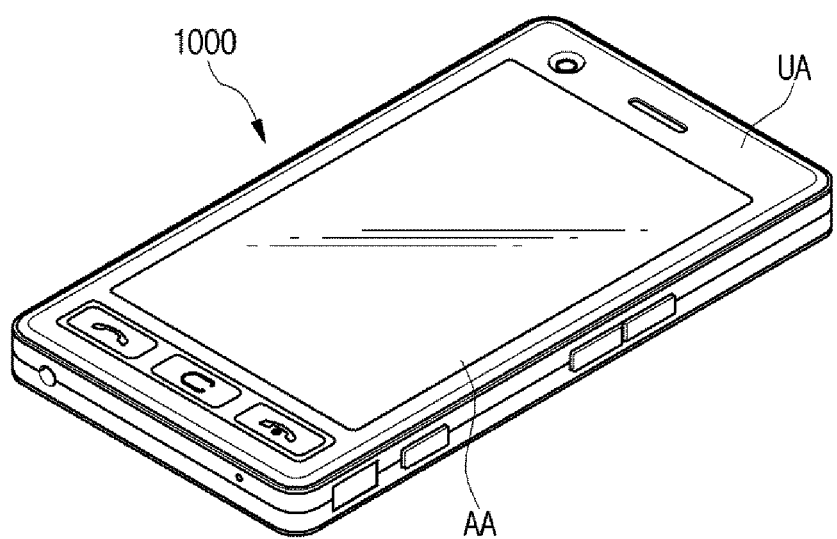
FIG. 20 is a view showing one example of a display to which a touch panel according to an embodiment is applied.

FIG. 20 is a view showing a mobile terminal including a touch panel described above. The mobile terminal 1000 may include an active area AA and an unactive area UA. The active area may sense a touch signal when a finger touches the active area AA, and an instruction icon pattern part and a logo may be formed in the unactive area UA. Although the mobile terminal is shown in FIG. 20 as one example, the electrode member and the touch panel described above may be applied to various electronic appliances, such as vehicles or home appliances, employing a display, as well as the mobile terminal.

The embodiment provides a touch panel having improved visibility reliability.

According to the embodiment, there is provided a touch panel which includes: a cover substrate on which an active area and an unactive area are defined; and a printing layer on the unactive area, wherein the printing layer includes: a first printing layer; and a second printing layer on the first printing layer, and wherein the second printing layer is spaced apart from the first printing layer.

According to the embodiment, the second printing layer is spaced apart from the first printing layer, so that the thickness of the printing layer formed on the cover substrate may be reduced. Thus, when the cover substrate and the substrate are laminated, a foam rate may be reduced due to the thickness of the printing layer so that the reliability may be improved. That is, according to the related art, since the number of printing colors of the printing layer is greater than that of the second printing layer, when the substrate is laminated on the cover substrate, the foam rate is increased so that an error rate is increased. However, according to the embodiment, since the second printing layer is disposed on the substrate, a lamination error due to a step difference between the printing layers may be reduced.

Since the second printing layer is spaced apart from the cover substrate, the visibility may be improved. According to the related art, the second printing layer having a dark color is formed on the cover substrate, so that the outer appearance is deteriorated when viewing it from the top. However, according to the embodiment, the printing layer is disposed on the substrate so that a black band is prevented from being revealed.

It will be understood that, when a layer (film), a region, a pattern or a structure is referred to as being "on" or "under" a substrate, another layer (film), region, pad or patterns, it can be "directly" or "indirectly" on the other layer (film), region, pattern or structure, or one or more intervening layers may also be present. Such a position of each layer described with reference to the drawings.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
   a cover substrate on which an active area and an unactive area are defined;
   a printing layer on the unactive area of the cover substrate;
   a substrate disposed on the active area and the unactive area of the cover substrate; and
   a sensing electrode and a wire electrode disposed on the substrate,
   wherein the sensing electrode and the wire electrode directly contact the substrate,
   wherein an optical transparent adhesive material is interposed between the cover substrate and the substrate,
   wherein the printing layer includes:
   a first printing layer that directly contacts the cover substrate; and
   a second printing layer provided on the substrate and the second printing layer is spaced apart from the first printing layer and the cover substrate, wherein a first side of the second printing layer is disposed in the unactive area, and a second side of the second printing layer is disposed in the active area,
   wherein the optical transparent adhesive material is disposed between the first printing layer and the wire electrode, wherein the sensing electrode is disposed in the active area, wherein the sensing electrode extends from the active area to the unactive area, wherein the wire electrode is disposed in the unactive area, wherein the wire electrode covers one side of the sensing electrode, wherein the second printing layer is partially disposed on the sensing electrode, and wherein the second printing layer is disposed on a boundary line between the active area and the unactive area.

2. The touch panel of claim 1, wherein the second printing layer has a color different from a color of the first printing layer.

3. The touch panel of claim 1, wherein the sensing electrode is provided on the substrate to sense a position.

4. The touch panel of claim 3, wherein the second printing layer is provided on the sensing electrode.

5. The touch panel of claim 3, wherein the second printing layer is provided on one surface of the substrate opposite a surface of the substrate where the sensing electrode is provided.

6. The touch panel of claim 1, wherein the first printing layer includes a white layer, and the second printing layer includes a black layer.

7. The touch panel of claim 1, further comprising a third layer on the first printing layer.

8. The touch panel of claim 7, wherein the third printing layer has a same color as a color of the second printing layer.

9. The touch panel of claim 7, wherein the third printing layer is provided in the unactive area of the cover substrate.

10. The touch panel of claim 7, wherein the third printing layer contacts the first printing layer and is spaced apart from the second printing layer.

11. The touch panel of claim 7, wherein a thickness of the third printing layer is less than a thickness of the first printing layer.

12. The touch panel of claim 7, wherein the third printing layer has a color different from a color of the first printing layer.

13. The touch panel of claim 1, wherein the substrate includes a first substrate and a second substrate, and
the sensing electrode includes a first sensing electrode on the first substrate, and a second sensing electrode on the second substrate.

14. The touch panel of claim 9, wherein the second printing layer is provided on at least one of the first and second substrates.

15. The touch panel of claim 9, wherein the second printing layer includes a fourth printing layer on the first substrate; and a fifth printing layer on the second substrate.

* * * * *